UNITED STATES PATENT OFFICE.

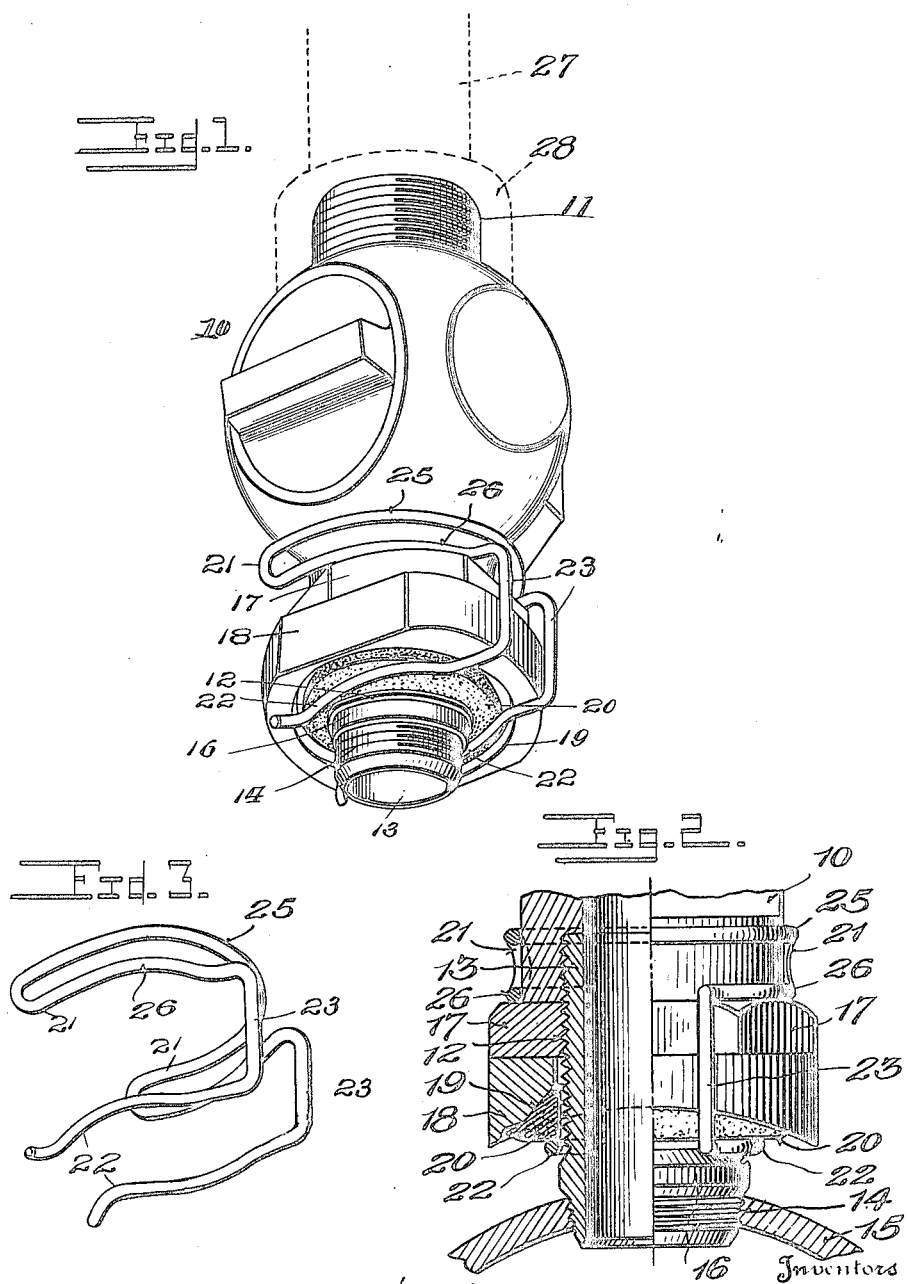

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

SADDLE-RETAINING CLIP FOR NIPPLES.

1,372,628.

Specification of Letters Patent. Patented Mar. 22, 1921.

Application filed November 12, 1919. Serial No. 337,497.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Saddle-Retaining Clips for Nipples, of which the following is a specification.

This invention relates to improvements in pipe fittings and particularly to that type of fitting wherein the connection between the main or other pipe and the branch member, such as a nipple, is sealed by means of a saddle and packing carried by the branch member. In this type of fitting considerable difficulty is experienced in retaining the saddle and packing upon the nipple during the operation of connecting the nipple to the pipe. This is especially the case when a branch or service connection is to be made to a pipe in which the fluid is under pressure, for in this instance, to prevent the escape of water from the main, a valve casing is clamped to the main at the point where the connection is to be made and, after an opening is formed in the main within the casing, the nipple carried by a suitable tool for rotating the same, is inserted in the casing.

The present invention has as its objects to provide an improved means for maintaining the saddle and packing against accidental displacement from the nipple during the operation of making a connection with the main or other pipe, and to this end we provide a clip which is simple in construction; which may be economically manufactured; and which may be readily applied preparatory to making the connection, and readily withdrawn after the connection has been made.

In the accompanying drawings, we have illustrated our improved retaining means as employed for securing a saddle and packing upon the nipple of the corporation cock, but it is to be understood that the present disclosure is illustrative only of our invention and is not restrictive thereof, and that our improved device may be employed generally in making connections to pipes where the fitting is other than the nipple of a corporation cock. In the present specification, the words "main" and "nipple" are used in their broad, generic senses.

In said drawings,—

Figure 1 is a perspective view of the corporation cock to which is applied our improved means for retaining the saddle and packing upon the nipple of the cock.

Fig. 2 is an elevational view of the assembly shown in Fig. 1, with the nipple of the cock threaded into an opening of the main, a portion of the cock being broken away for illustrative purposes, and Fig. 3 is a perspective view of our improved clip.

Referring to the drawings, wherein like numerals indicate like parts in the several views, 10 designates a corporation cock which may be of any suitable construction, in the present instance it being illustrated as having a threaded integral nipple 11 at its outer end which is to receive a service pipe or the like. The opposite or inner end of the cock has an internally threaded opening which receives the complementary threads 12 upon the outer end of a separate nipple 13. The nipple 13 at its inner end is threaded as at 14 so that it may be screwed into an opening in the wall of the main or pipe 15, a fragment of which is shown in cross-section in Fig. 2. Between the threaded portions 12 and 14 of the nipple is a plain or unthreaded annular portion 16 adapted to receive a pipe wrench when screwing the nipple into the threaded opening of the corporation cock. Upon the threaded portion 12 of the nipple is the lock-nut 17. The numeral 18 designates the usual saddle, the inner face of which is cylindrically concave to conform substantially to the outer contour of the main 15. The saddle has a through opening which is of sufficient diameter to pass over the unthreaded portion 16 of the nipple and about this opening is an annular groove or recess 19 in which a suitable packing 20 of felt or the like is fitted.

The structure described in the preceding paragraph forms no part of the present invention, it being shown merely to illustrate the application of our improved saddle retaining means.

Our improved retaining means for holding the saddle against accidental withdrawal from the nipple comprises, generally, a clip having a pair of double jaws 21 adapted to receive the inner end of the body portion of the cock, a second pair of jaws or spring fingers 22 lying in parallelism with the jaws 21 and adapted to receive the nipple 13 and a pair of arms 23 connecting the two pairs of jaws 21 and 22.

The clip is preferably formed from a single strand of relatively heavy resilient wire. The strand of wire is folded over at a point intermediate its ends into the form of an elongated U and the closed end of the folded wire is then bent over and backwardly to form a loop 25 and this loop and the sections 26 which it overlies form a pair of double jaws 21. The wire at the ends of the sections 26 is bent at right angles to the plane of the loop 25 to provide the arms 23 and then the free ends of the wire are bent at right angles to the arms 23 and in the same direction as the jaws 21 to form the spring fingers or jaws 22. The free ends of the jaws 21 are bent inwardly toward each other so that they will grip the corporation cock when placed thereabout and the fingers 22 intermediate their ends are curved outwardly so as to accommodate the nipple 13.

To assemble the parts described, the locknut 17 is screwed onto the threaded portion 12 of the nipple 13 and thereafter the nipple 13 is screwed into the threaded opening of the corporation cock by applying a wrench to the plain unthreaded portion 16. The nut is screwed up against the inner end of the corporation cock 10 and the saddle 18 is then slipped over the nipple with its outer flat surface engaging against the lock-nut. The packing 20 is fitted into the recess 19 of the saddle. The spring clip is then placed in position with its double jaws 21 around the round portion of the cock immediately above and in engagement with the lock-nut 17 and with the spring fingers 22 engaging the under surface of the saddle and packing. The two arms 23 should pass about the curved end portion of the saddle as shown in Fig. 1 so that the fingers or jaws 22 will extend longitudinally of the concave face of the saddle. In this position the arms 23 will not interfere with the application of a wrench to the flat wrench grips of the saddle.

After the parts have been assembled as described, the corporation cock is connected to a suitable tool whereby the nipple 13 of the cock may be screwed into the tapped opening in the main. Any suitable means may be employed for inserting the nipple in the opening of the main and, if desired, the well-known Mueller tapping machine may be used for this purpose. The nipple 11 of the corporation cock is connected to the boring bar, shown in dotted lines in Fig. 1 and designated by the numeral 27, by means of a suitable tool 28, also shown in dotted lines in Fig. 1, and this tool 28 may be similar to that shown in the patent to Philip Mueller, 1,024,096, granted April 23, 1912. After the corporation cock is connected to the boring bar, the cock is inserted into the usual valve casing which is connected to the main and the boring bar is then rotated to screw the nipple 13 into place.

After the nipple 13 is screwed into place in the main, the tapping machine and the valve casing are removed and the clip is then withdrawn from the corporation cock. The saddle and packing are then moved downwardly until they engage the outer surface of the main, and the nut-lock 17 is then screwed tightly against the outer face of the saddle.

If desired, the end of the nipple 13 which extends into the main may be expanded and for this purpose any suitable device may be employed, the well-known Mueller expanding machine being referred to by way of example.

We claim:

1. A clip for retaining saddles on branch members comprising a pair of jaws adapted to grip the branch member on one side of the saddle and a pair of fingers adapted to straddle the branch member on the other side of the saddle.

2. A clip for retaining saddles on branch members comprising a pair of spring jaws adapted to grip the branch member on one side of the saddle and a pair of fingers having portions at right angles to the plane of the jaws and having end portions bent into parallelism with said jaws and adapted to straddle the branch member on the other side of said saddle.

3. The combination with a branch member and a saddle thereon, of a clip comprising a pair of jaws gripping said branch member on one side of the saddle and a pair of fingers extending about the edge of the saddle and engaging the inner face of the same.

4. The combination with a branch member having an abutment and a saddle, of a clip having a pair of spring jaws gripping said branch member and engaging said abutment, and a pair of fingers having portions at right angles to the plane of the jaws and end portions in parallelism with said jaws and engaging the inner face of the saddle.

5. The combination with a corporation cock having a threaded nipple, a nut threaded on the nipple, and a saddle loose on the nipple, of a clip having a pair of spring jaws gripping the cock body and engaging said nut, and a pair of fingers extending about the edge of said nut and saddle and engaging the inner face of the saddle, 6. In combination, a corporation cock having a threaded nipple, a lock nut threaded on the nipple and against said cock, and a saddle and washer on said nipple, of a clip formed of a strand of wire bent into U-shape with the closed portion bent over to form a pair of double jaws adapted to grip the cock body, said clip having portions at right angles to the plane of said jaws and a pair of fingers in parallelism with said jaws and engaging the inner face of said washer or saddle.

In testimony whereof we have hereunto set our hands.

PHILIP MUELLER.
ANTON C. SCHUERMANN.